United States Patent
Vahid Far et al.

(10) Patent No.: US 11,356,138 B1
(45) Date of Patent: Jun. 7, 2022

(54) DELAY STATE-SWITCHING RF MODULE

(71) Applicant: Apple Inc., Cupertino, CA (US)

(72) Inventors: Mohammad B. Vahid Far, San Jose, CA (US); Khaye Loon Wei, Mountain View, CA (US); Mohammad-Saleh Moonesan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/146,967

(22) Filed: Jan. 12, 2021

(51) Int. Cl.
| | | |
|---|---|---|
| *H04B 1/00* | (2006.01) | |
| *H04B 1/44* | (2006.01) | |
| *H04B 1/403* | (2015.01) | |
| *H04B 1/401* | (2015.01) | |
| *H04B 17/364* | (2015.01) | |

(52) U.S. Cl.
CPC ............... *H04B 1/401* (2013.01); *H04B 1/44* (2013.01); *H04B 17/364* (2015.01)

(58) Field of Classification Search
CPC . H04B 1/006; H04B 1/44; H04B 1/00; H04B 1/0057; H04B 1/0458; H04B 1/16; H04B 1/18; H04B 1/48; H04B 1/50; H04B 1/52; H04B 1/525; H03H 7/38; H03H 9/14544; H03H 9/64; H03H 9/6403; H03H 9/6483; H03H 9/72; H04M 1/271; H04M 1/275; H04M 2250/02
USPC .............................................. 455/78; 375/347
See application file for complete search history.

(56) References Cited

U.S. PATENT DOCUMENTS

| | | |
|---|---|---|
| 7,406,610 B2 | 7/2008 | Kardach et al. |
| 8,422,477 B2 | 4/2013 | Gupta et al. |
| 8,571,066 B2 | 10/2013 | Gupta et al. |
| 8,826,047 B1 | 9/2014 | Zhu et al. |
| 9,762,482 B2 | 9/2017 | Sukumar et al. |
| 10,432,247 B2 * | 10/2019 | Pawliuk .............. H04W 56/002 |
| 2009/0204837 A1 | 8/2009 | Raval et al. |
| 2013/0182804 A1 * | 7/2013 | Yutaka ..................... H04B 1/30 |
| | | 375/347 |
| 2016/0127008 A1 * | 5/2016 | Obkircher ................ H04B 1/44 |
| | | 455/78 |
| 2016/0179372 A1 * | 6/2016 | Sinclair ................. G06F 3/0688 |
| | | 711/103 |
| 2017/0269675 A1 | 9/2017 | Klacar et al. |
| 2018/0343000 A1 * | 11/2018 | Nosaka ...................... H04B 1/48 |
| 2019/0140669 A1 * | 5/2019 | Aikawa ..................... H04B 1/16 |
| 2019/0391635 A1 | 12/2019 | Lakkis et al. |
| 2020/0008167 A1 | 1/2020 | Venkataraman et al. |

(Continued)

*Primary Examiner* — Tan H Trinh
(74) *Attorney, Agent, or Firm* — Fletcher Yoder, P.C.

(57) ABSTRACT

Embodiments disclosed herein relate to transition of a radio frequency module between a first operating state and a second operating state. The first and second states may be passive/slow (e.g., non-active) states or active/fast states. A passive state may include a sleep state, an idle state, an off state, or a low power state. An active state may include a receiving state or a transmitting state, for receiving and transmitting signals, respectively. If the first operating state is an active state and the second operating state is a passive state, the transition from the first operating state may be delayed such that the radio frequency module transitions directly from the first operating state to a third operating state. This enables the radio frequency module to avoid entering a passive second state with a slow settling time which can interfere with communications and operation of the radio frequency module.

20 Claims, 4 Drawing Sheets

(56) References Cited

U.S. PATENT DOCUMENTS

| | | |
|---|---|---|
| 2020/0280332 A1 | 9/2020 | Mangano et al. |
| 2020/0366320 A1* | 11/2020 | An ........................ H04B 1/406 |
| 2020/0389531 A1* | 12/2020 | Lee ..................... H04L 61/1511 |
| 2021/0273673 A1* | 9/2021 | Hanaoka .................. H04B 1/44 |
| 2021/0351835 A1* | 11/2021 | Woo ..................... H04B 7/0408 |

* cited by examiner

DELAY STATE-SWITCHING RF MODULE

BACKGROUND

The present disclosure relates generally to wireless communication, and more specifically to switching between states of a radio frequency module in wireless communication devices.

In particular, the radio frequency module may switch between operational states (e.g., active states, passive states, or both) during operation of a wireless communication device. When switching to a state, there may be a "settling time" before the state is operational. Active states (e.g., a transmission state, a reception state, and the like) are so-called because it is desirable to have fast responses by the radio frequency module in such states, and thus the active states may have faster settling times. Passive states (e.g., a sleep state, an idle state, an off state, a low power state, and the like) are often slower to respond, and thus may have slower settling times. However, when transitioning between passive and active states, the slower settling times of the passive states may affect communication and operational performance of the active states.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An aspect of the disclosure provides radio frequency front-end circuitry that may have comparison logic that receives an indication of a first operating state of the radio frequency front-end circuitry. The comparison logic may receive an indication of a second operating state of the radio frequency front-end circuitry and delay a transition from the first operating state for a delay period if the first operating state is an active state and the second operating state is a passive state. The comparison logic may receive an indication of a third operating state of the radio frequency front-end circuitry. The radio frequency front-end circuitry may include processing circuitry that causes the radio frequency front-end circuitry to enter the first operating state, and enter the third operating state after the delay period if the first operating state is the active state and the second operating state is the passive state.

Another aspect of the disclosure provides a method that may include receiving, via processing circuitry, a first operating state of radio frequency front-end circuitry. The method may include implementing, via the processing circuitry, the first operating state of the radio frequency front-end circuitry. The method may include receiving, via the processing circuitry, a second operating state of the radio frequency front-end circuitry. The method may include determining, via the processing circuitry, that the first operating state is an active state and the second operating state is a passive state. The method may include maintaining, via the processing circuitry, the radio frequency front-end circuitry in the first operating state, receiving, via the processing circuitry, a third operating state of the radio frequency front-end circuitry, and implementing, via the processing circuitry, the third operating state.

Another aspect of the disclosure provides a user equipment including one or more antennas and one or more integrated circuits. The user equipment may have radio frequency front-end circuitry disposed and coupled to the one or more antennas and the one or more integrated circuits. The radio frequency front-end circuitry may have comparison logic that may receive an indication of a first operating state of the radio frequency front-end circuitry. The comparison logic may receive an indication of a second operating state of the radio frequency front-end circuitry and determine to delay a transition from the first operating state if the first operating state is an active state and the second operating state is a passive state. The comparison logic may receive an indication of a third operating state of the radio frequency front-end circuitry. The radio frequency front-end circuitry may have processing circuitry that causes the radio frequency front-end circuitry to enter the first operating state, enter the third operating state after the delay period if the first operating state is the active state and the second operating state is the passive state.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

Timing requirements for a radio frequency module of a radio frequency front-end (RFFE) to switch between states are critical to ensure accurate communications and operation of the radio frequency module. As discussed above, the operating states of the radio frequency module may be a passive state (e.g., non-active) state or an active state. The passive (or slow) state may include a sleep state, an idle state, an off state, or a low power state. The active (or fast) state may include a receiving state or a transmitting state, for receiving and transmitting signals, respectively.

Transitioning from an active state to a subsequent active state may sometimes include transition to an intermediate passive state due to the bits describing the respective states. For example, it may be desired to transition from an initial active state corresponding to 001 to a target active state corresponding to 010. However, because only a single bit may be changed at a time, the transition from the initial active state (001) to the target active state (010) may include first transitioning from the initial active state (001) to an intermediate state (from 001 to 011 or from 001 to 000), and then transitioning to the target active state (from 011 to 010 or from 000 to 010). If the intermediate state is a passive state, then this transition to the passive state may increase a total transition time from the initial active state to the target active state due to the increased settling time of the passive state. This increased settling time of the passive state may correspond to a time it takes a signal indicating a current state of the radio frequency module to settle. As such, this increased settling time may prevent the radio frequency module from transitioning to the target active state until the passive state settles.

This disclosure is directed to improving transition time between operating states of the radio frequency module. To reduce an occurrence of a slow settling time of a passive state from interfering with or slowing the communications of the radio frequency module, the radio frequency module may delay the transition from an initial active state to an intermediate passive state. For example, if a first operating state of the radio frequency module is active and a second operating state (e.g., the intermediate state) is passive, the radio frequency module may maintain the first operating state (e.g., without transitioning to the second operating state) until an indication of a third operating state (e.g., a target state) is received. If the third operating state is an active state, the radio frequency module may transition directly from the first state to the third state (e.g., without transitioning to the second operating state). That is, the radio frequency module may transition to the third operating state without entering the second operating state, effectively skipping the second operating state (e.g., blocking or preventing transition to the second operating state). By maintaining the first operating state and preventing transition to the second operating state, the radio frequency module may avoid or substantially reduce an occurrence of a slow settling time of a passive state (e.g., the second operating state) from interfering with or slowing a transition to a subsequent operating state. By not entering an intermediate passive state, the radio frequency module may increase responsiveness of communications thereof.

In some cases, the third operating state may be the same as the second operating state. In that case, the second state is not an "intermediate" state (e.g., a state that facilitates transitioning between two target states), but a target state itself. For example, the second and third operating states may both be the active TX state (010). Thus, after the radio frequency module is maintained in the first operating state for a delay period, the radio frequency module transitions to the "target" state, which is the second operating state and the third operating state.

For any other transition between the first operating state and the second operating state (e.g., if the first state is passive or the second or intermediate state is active), the transition may not be delayed. For example, if the first state is an active state and the second state is an active state, the faster settling time of the second state may have a reduced effect on the communications of the radio frequency module. Similarly, if the first state is passive and the second state is active, a transition of the radio frequency module to the second state may not interfere or delay communications of the radio frequency module. In that case, the radio frequency module may transition to the second operating state before an indication of the third operating state is received (e.g., without delay). If both the first state and the second state are passive, the radio frequency module may transition to the passive second state because maintaining the passive first operating state may not provide an improved transition time to a passive or active third operating state.

Figure 1:
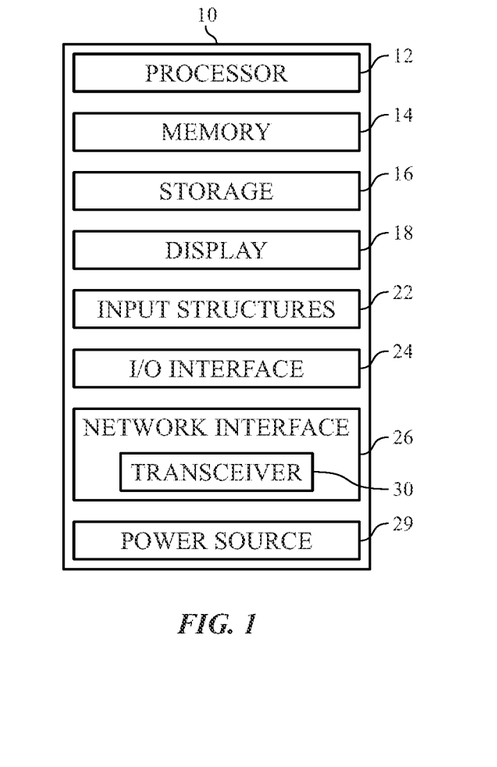
FIG. 1 is a block diagram of an electronic device, according to an embodiment of the present disclosure.

FIG. 1 is a block diagram of an electronic device 10, according to an embodiment of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop computer, a notebook computer, a portable electronic or handheld electronic device (e.g., a wireless electronic device or smartphone), a tablet, a wearable electronic device, and other similar devices. It should be noted that the processor 12 and other related items in FIG. 1 may be generally referred to herein as "data processing circuitry." Such data processing circuitry may be embodied wholly or in part as software, software, hardware, or any combination thereof. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas (not shown in FIG. 1). In some embodiments, the transceiver 30 may include a radio frequency front-end (RFFE) (not shown in FIG. 1). In some cases, to prevent interference of communications of state changes of the transceiver 30, the electronic device 10 may include processing circuitry (not shown in FIG. 1) to identify a current state and a subsequent state of the transceiver 30. The processing circuitry may determine to delay the transition from the current state to the subsequent state if the current state is an active state and the subsequent state is a passive state. That is, the processing circuitry may prevent the transceiver from entering an intermediate passive state between the current state and the subsequent state such that the transition is not interrupted or delayed due to an increased settling time of the transition.

The power source 29 of the electronic device 10 may include any suitable source of power, such as a rechargeable battery (e.g., lithium polymer (Li-poly) battery) and/or an alternating current (AC) power converter. In certain embodiments, the electronic device 10 may take the form of a computer, a portable electronic device, a wearable electronic device, or other type of electronic device.

Figure 2:
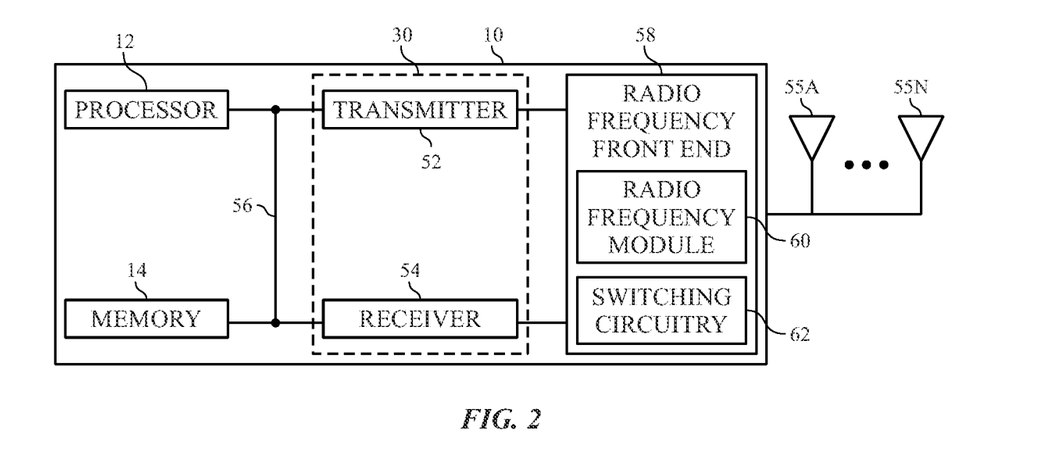
FIG. 2 is a functional block diagram of the electronic device of FIG. 1 that may implement the components shown in FIG. 1 and/or the circuitry and/or components described in the following figures, according to embodiments of the present disclosure.

FIG. 2 is a functional block diagram of the electronic device 10 that may implement the components shown in FIG. 1 and/or the circuitry and/or components described in the following figures, according to embodiments of the present disclosure. The electronic device 10 includes a radio frequency front-end 58 disposed and coupled between the transceiver 30 and one or more antennas 55. As illustrated, the processor 12, the memory 14, the transceiver 30, the transmitter 52, the receiver 54, the radio frequency front-end 58, and/or the antennas 55 (illustrated as 55A-55N) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and a remote location via, for example, a network or direction connection associated with the electronic device 10 and an external transceiver (e.g., in the form of a cell, eNB (E-UTRAN Node B or Evolved Node B), base stations, and the like. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, each beam, when implement as multi-beam antennas, may have its own transceiver 30. The electronic device 10 may include (not shown) multiple transmitters, multiple receivers, multiple transceivers, and/or multiple antennas as needed for various communication standards.

The transmitter 52 may be configured to wirelessly transmit packets having different packet types or functions. For example, the transmitter 52 may be configured to transmit packets of different types generated by the processor 12. The receiver 54 may be configured to wirelessly receive packets having different packet types. In some examples, the receiver 54 may be configured to detect a type of a packet used and to process the packet accordingly. In some embodiments, the transmitter 52 and the receiver 54 may be configured to transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

As shown, the radio frequency front-end 58 includes a radio frequency module 60 and switching circuitry 62. The switching circuitry 62 may enable routing of incoming received signals (e.g., RX signals) received via the antennas 55 to the receiver 54 and/or outgoing transmission signals (e.g., TX signals) from the transmitter 52 to the antennas 55. The radio frequency module 60 may implemented as logic or processing circuitry of the radio frequency front-end 58. For example, the radio frequency module 60 may include decoder logic or circuitry to receive RX signals and route the RX signals to the receiver 54, and/or receive TX signals and route the TX signals to the antennas 55, respectively.

The logic or processing circuitry of the radio frequency module 60 may identify various operating states of the radio frequency module 60 (e.g., active and/or passive) and determine whether to delay a transition from a first operating state of the radio frequency module 60. That is, the processing circuitry of the radio frequency module 60 may identify a first state (e.g., a current or initial state) and a second state (e.g., a subsequent or intermediate state) of the radio frequency module 60. If the first state of the radio frequency module 60 is an active state and the second state of the radio frequency module 60 is a passive state, the processing circuitry may maintain the radio frequency module 60 in the first state, thus delaying the transition from the first state to substantially reduce an occurrence of an increased transition time caused by an intermediate passive second state. That is, the processing circuitry may enable the radio frequency module 60 to transition directly from the first state to a third state (e.g., a target state) without transitioning to an intermediate passive second state.

Embodiments herein provide various apparatuses and techniques to reduce or substantially prevent an increased settling time of the radio frequency module 60 by maintaining the radio frequency module 60 in the first state (e.g., the current state) when the first state is an active state and the second state (e.g., subsequent state) is a passive state. That is, the processing circuitry of the subsequent may delay a transition out of the first state when the first state is an active state and the second state is a passive state.

A settling time for an active state may be about 0.5 microseconds (μ), and a settling time for a passive state may be about 2 μs. In that case, the longer transition time (e.g., settling time) of the passive second intermediate state may slow down the overall transition from the first state to the third state. To prevent the radio frequency module 60 from entering (e.g., transitioning to) the passive second state, the transition out of the active first state (e.g., the current state) is delayed.

The period of time that the radio frequency module 60 maintains the first operating state (e.g., a length of the delay) may be determined based on the first state. The processing circuitry may determine a length of the delay to be between about 1 μs and about 2.5 μs, for example, about 2 μs. The period of the delay may be different for each transition. This is because the length of the delay may be based on a component of the electronic device 10 from which the control signal corresponding to the third state is received. That is, the length of the delay may be based on a maximum time period (e.g., a maximum delay $T_d$) it takes for the signal indicating the third state to be sent from the component and received by the radio frequency module 60. Moreover, because the first state is known, and the possible next states that the first state may transition to may be limited and also known, the maximum delay $T_d$ may be the greatest time it takes to receive respective controls signals from the possible components indicating a possible next state. For example, a delay for a transition from an RX state (001) may be different than a delay for a transition from a TX state (010). Thus, the maximum delay $T_d$ may provide a time period to enable the radio frequency module 60 to receive the signal that indicates the third operating state, identify bits in control lines corresponding to the third operating state, and/or identify a state type of the third operating state.

Figure 3:
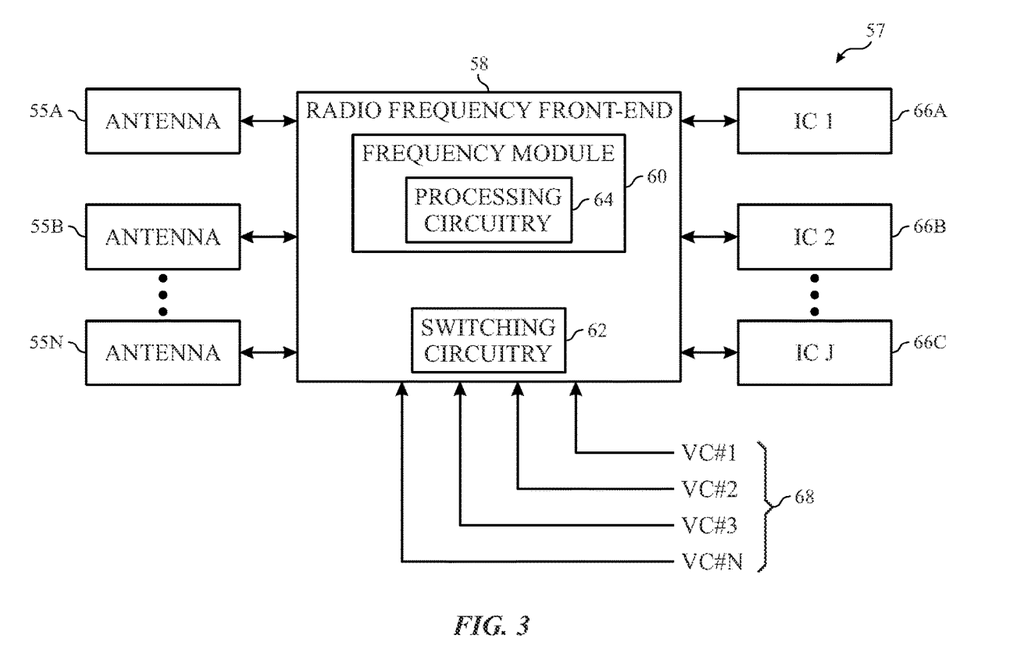
FIG. 3 is a block diagram of example wireless communication circuitry of the electronic device of FIG. 1 including radio frequency front-end circuitry, according to an embodiment of the present disclosure.

FIG. 3 is a block diagram of example wireless communication circuitry 57 of the electronic device 10 of FIG. 1, according to an embodiment of the present disclosure. The wireless communication circuitry 57 may include the components of the electronic device 10 discussed with respect to FIG. 2. For example, the wireless communication circuitry 57 includes one or more antennas 55A-55N and a radio frequency front-end 58 having a radio frequency module 60 and switching circuitry 62. As shown, the radio frequency module 60 is coupled to one or more integrated circuits 66A-66N and coupled to the one or more antennas 55A-55N. The integrated circuits 66A-66N may include systems on a chip (SOCs), radio chips, or similar subsystems. The radio frequency module 60 includes processing circuitry 64 that may identify at least a first state (e.g., a current or initial state), a second state (e.g., an intermediate state), and a third state (e.g., a target state) of the radio frequency module 60.

The processing circuitry 64 may determine the states of the radio frequency module 60 based on one or more control signals 68 (VC1-VCN) received by the radio frequency front-end 58. That is, the radio frequency front-end 58 may provide indications of at least the first state, the second state, and the third state via the control signals 68 VC1-VCN. Accordingly, the processing circuitry 64 may use the control signals 68 to determine at least the first state, the second state, and the third state of the radio frequency module 60. However, the radio frequency module 60 may receive the control signals 68 at different times. For example, the radio frequency module 60 may receive a first control signal 68 indicating a first operating state. In response to receiving the control signal 68 indicating the first operating state, the processing circuitry 64 may determine a state type of the first operating state, and cause the radio frequency module 60 to enter the first operating state.

Subsequently, while in the first operating state, the radio frequency module 60 may receive a second control signal 68 indicating a second operating state of the radio frequency module 60. The processing circuitry 64 may determine a state type of the second operating state. As discussed above, if the first state is an active state and the second state is a passive state, the processing circuitry 64 may determine a delay or time period for the radio frequency module 60 to maintain the first state. Thus, the processing circuitry 64 may use the first and second states to determine whether to delay the transition from the first state of the radio frequency module 60.

If the processing circuitry 64 determines to delay the transition, then the radio frequency module 60 maintains the first operating state. That is the processing circuitry 64 may block or prevent the radio frequency module 60 from entering the second operating state. If the transition of the radio frequency module 60 from the first operating state is delayed, the radio frequency module 60 may receive a third control signal 68 indicating a third operating state while in the first operating state. In that case, after the delay period ends, the processing circuitry 64 may cause the radio frequency module 60 to enter a third operating state. In some cases, the third operating state may be the same as the second operating state (thus indicating that the second operating state was the target state, and not an intermediate state). If the processing circuitry 64 determines not to delay the transition from the first operating state, then the processing circuitry 64 causes the radio frequency module 60 to directly enter the second operating state (e.g., without delay). In that case, the radio frequency module 60 may enter the second operating state before radio frequency module 60 receives the control signal 68 indicating the third operating state.

Figure 4:
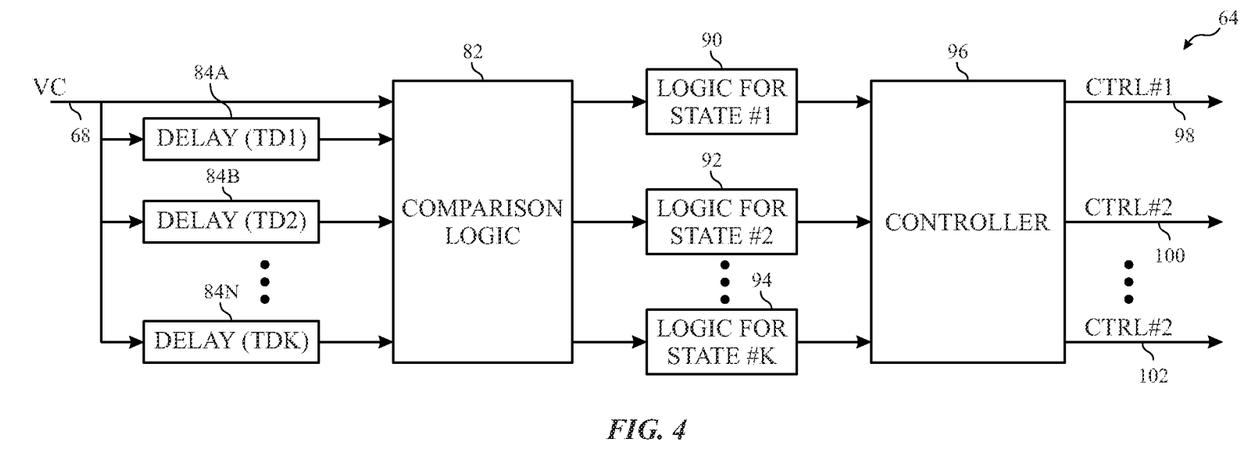
FIG. 4 is a block diagram of processing circuitry of the example radio frequency front-end circuitry of FIG. 3, according to an embodiment of the present disclosure.

FIG. 4 is a block diagram of processing circuitry 64 of the example radio frequency front-end circuitry 58 of FIG. 3, according to an embodiment of the present disclosure. As discussed above, the processing circuitry 64 may be included in the radio frequency module 60 of the electronic device 10. In some embodiments, some or all of the processing circuitry 64 may be disposed within the radio frequency front-end 58 and external to the radio frequency module 60.

As illustrated, comparison logic 82 of the processing circuitry 64 may receive one or more control signals 68. The processing circuitry 64 may determine and apply various delay periods based on the control signals 68 and the operating states indicated by the control signals 68. That is, the comparison logic 82 may receive a delay period from one or more delay logic circuits 84A-84N. Each delay logic 84A-84N may provide a delay period for a particular operating state. As an example, the comparison logic 82 may receive one or more control signals 68 indicating a first operating state of the radio frequency module 60. A controller 96 may cause the radio frequency module 60 to enter the first operating state. While in the first operating state, the comparison logic 82 may receive one or more control signals 68 indicating a second operating state. The comparison logic 82 identifies a state type (e.g., active and/or passive) of the first and second states. If the first operating state is an active state and the second operating state is a passive state, the comparison logic delays a transition of the radio frequency module 60 from the first operating state using an appropriate delay logic 84A-84N.

In some embodiments, the comparison logic 82 may reference a look-up table to determine an appropriate delay logic 84A-84N to be applied. For example, the comparison logic 82 may input the first operating state into the lookup table and receive the appropriate delay period and/or appropriate delay logic 84A-84N to be applied to the transition from the first operating state. Once the appropriate delay period/delay logic 84A-84N is determined, the comparison logic 82 may hold the state logic 90, 92, 94 for the second operating state until expiration of the delay period.

The processing circuitry 64 may also include state logic 90, 92, 94 that causes the radio frequency front-end 58 to enter each operating state. In some embodiments, the state logic 90, 92, 94 may be implemented as a combination of one or more logic gates, one or more capacitors, and/or one or more delay gates. As mentioned above, the comparison logic 82 may block a transition from or hold a state for the delay period according to the appropriate delay logic 84A-84N. That is, the comparison logic 82 may prevent the next operating state (e.g., the second operating state) from propagating to the controller 96. Thus, the state logic 90, 92, 94 may be delayed by the corresponding delay logic 84A-84N and provide the next operating state to the controller 96. In some embodiments, the state logic 90, 92, 94 may be implemented as a flip-flop that facilitates determining whether to apply the delay period of the corresponding delay logic 84A-84N based on a comparison of voltage levels corresponding to the first operating state and the second operating state. In some embodiments, the controller 96 may reference a look-up table to determine one or more control signals 98, 100, 102 to output to enable the radio frequency module 60 to enter the target operating state. For example, the controller 96 may input the target operating state and receive the one or more control signals 98, 100, 102 to cause the radio frequency module 60 to enter the target operating state, and control and/or operate respective subsystems of the electronic device 10 according to the target operating state Based on the first state and the second state of the radio frequency module 60, the comparison logic 82 may determine to delay a transition from the first state of the radio frequency module 60. To do so, the comparison logic 82 receives an indication of a first operating state (e.g., current operating state) of the radio frequency module 60 based on a first control signal 68. The comparison logic 82 also receives an indication of a second operating state of the radio frequency module 60 based on a second control signal 68. The comparison logic 82 may determine state types (e.g., active or passive) of the first operating state and the second operating state. The comparison logic 82 may determine whether to delay the transition of the radio frequency module 60 from the first operating state based on the first operating state, the second operating state, the type of the first operating state, and the type of the second operating state.

For example, if the first operating state is an active state and the second operating state is a passive state, the comparison logic 82 may identify an applicable delay period and delay the transition of the radio frequency module 60 from the first operating state by the applicable delay period. Delaying the transition of the radio frequency module 60 from the first operating state may reduce an occurrence of a longer settling time caused by a passive second state and thus increase responsiveness of the wireless communication circuitry 57 of the electronic device 10. The delay period may be long enough for the comparison logic 82 to receive an indication of a third operating state (e.g., a target operating state) of the radio frequency module 60 based on a third control signal 68. The radio frequency module 60 may thus transition to the third operating state directly from the first operating state, without entering the second operating state. That is, the radio frequency module 60 may enter the third operating state upon expiration of the applicable delay period, thus increasing effectiveness and responsiveness of the wireless communication circuitry 57. The indications of the first, second, and third operating states may be include the states themselves (e.g., bits describing the states), indications of the states, indications of transitions out of a current operating state, or indications of changes of operating state of the radio frequency front-end.

The controller 96, which may be implemented by the processing circuitry 64, may receive an instruction from the state logic 90, 92, 94 to enter a corresponding operating state (e.g., the first operating state, the second operating state, or the third operating state). The controller 96 may cause the radio frequency front-end 58 to enter the first operating state. If the comparison logic 82 determines to delay the transition of the radio frequency module 60 from the first operating state, then the controller 96 may cause the radio frequency module 60 to maintain the first operating state until expiration of the applicable delay period corresponding to the delay logic 84A-84N. For example, the controller 96 may cause the radio frequency module 60 to maintain the first operating state if the first operating state is an active state (e.g., RX or TX) and the second operating state is a passive state (e.g., sleep or idle). Upon expiration of the applicable delay period, the controller 96 may cause the radio frequency module 60 to transition from the first operating state to the third operating state, without entering the second operating state. In some cases, the third operating state may be the same as the second operating state. In that case, the radio frequency module 60 may transition from the first operating state to the second/third operating state upon expiration of the applicable delay period. That is, the second operating state may be the "target" operating state of the radio frequency module 60. If the comparison logic 82 determines not to delay the transition of the radio frequency module 60 from the first operating state (e.g., the first state is a passive state or the second state is an active state, the controller 96 may cause the radio frequency module 60 to enter the second operating state, without applying a delay period.

In some embodiments, the comparison logic 82 may receive an indication of a fourth operating state of the radio frequency module 60 via the control signals 68. When the fourth operating state is received, a current operating state of the radio frequency module 60 may be the third (or second) operating state, as discussed above. If a current state of the radio frequency module 60 is the third operating state, the comparison logic 82 may determine to delay a transition from the third state of the radio frequency module 60. The comparison logic 82 may determine state types (e.g., active or passive) of the third operating state and the fourth operating state. The comparison logic 82 may determine whether to delay the transition of the radio frequency module 60 from the third state based on the third operating state, the fourth operating state, the type of the third operating state, and the type of the fourth operating state.

For example, if the third operating state is an active state and the fourth operating state is a passive state, the comparison logic 82 may identify an applicable delay period. As discussed above with respect to the transition from the first operating state, the comparison logic 82 may delay the transition of the radio frequency module 60 from the third operating state by the applicable delay period. Similar to delaying the transition from the first operating state discussed above, delaying the transition of the radio frequency module 60 from the third operating state may reduce an occurrence of a longer settling time caused by a passive fourth state and thus increase responsiveness of the wireless communication circuitry 57 of the electronic device 10. The delay period may be long enough for the comparison logic 82 to receive an indication of a fifth operating state (e.g., a subsequent target operating state) of the radio frequency module 60 based on a fifth control signal 68. The radio frequency module 60 may thus transition to the fifth operating state directly from the third operating state, without entering the fourth operating state. That is, the radio frequency module 60 may enter the fifth operating state upon expiration of the applicable delay period, thus increasing effectiveness and responsiveness of the wireless communication circuitry 57.

Figure 5:
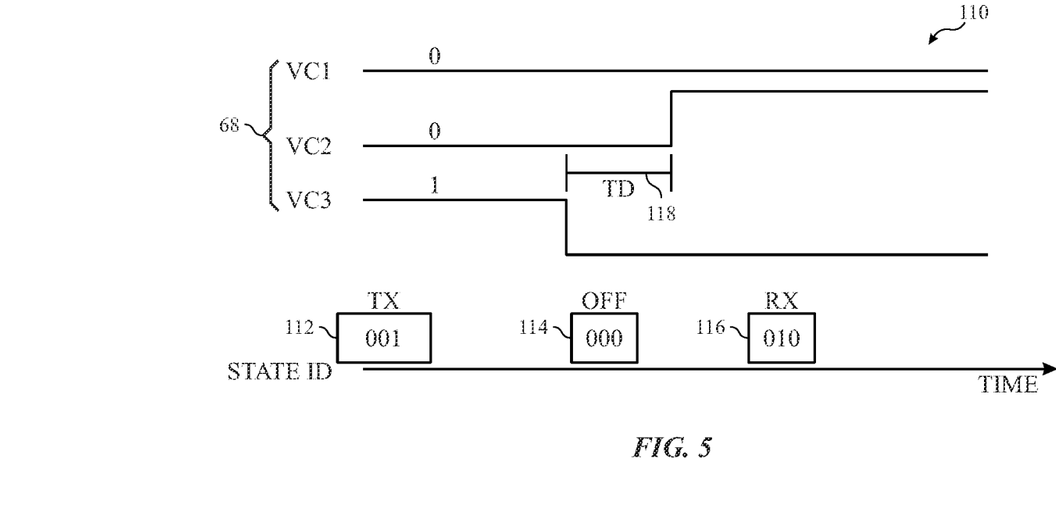
FIG. 5 is an example timing diagram of a transition between states of the example radio frequency front-end circuitry of FIG. 3, according to an embodiment of the present disclosure.

FIG. 5 is an example timing diagram 110 of a transition between states of the example radio frequency front-end circuitry 58 of FIG. 3, according to an embodiment of the present disclosure. As illustrated, a first operating state 112 of the radio frequency front-end 58 corresponds to a TX state of 010, a second operating state 114 of the radio frequency front-end 58 corresponds to an off state of 000, and a third operating state 116 of the radio frequency front-end 58 corresponds to an RX state of 001. That is, the first operating state 112 and the third operating state 116 are active states and the second operating state 114 is a passive state.

A control signal 68 corresponding to each of the operating states 112, 114 is received by the comparison logic 82 discussed with respect to FIG. 4. The controller 96 causes the radio frequency module 60 to enter the first operating state 112. Because the first operating state 112 is an active state and the second operating state 114 is a passive state, the comparison logic 82 determines to delay the transition of the radio frequency module 60 from the first operating state 112 by a delay period ($T_d$) 118. In that case, the comparison logic 82 may apply the delay period by delaying the next state (e.g., the second state) from propagating to the controller 96 for the delay period. After the delay period 118 expires, the controller 96 receives a control signal 68 indicating the third operating state 116 from the state logic 90, 92, 94. The controller 96 causes the radio frequency module 60 to transition from the first operating state 112 to the third operating state 116, without entering the second operating state 114.

The delay period ($T_d$) 118 may be a maximum delay or travel time it takes for the control signal 68 indicating the third state to be sent from a source component of the electronic device 10 and received by the radio frequency module 60. The maximum delay period 118 and various delays discussed with respect to FIG. 4 may be determined via a standardized testing process (e.g., uniform for each model of an electronic device), via a testing process during manufacturing, which could be performed for each electronic device and thus be unique for each electronic device, and so on.

Advantageously, by not entering the second operating state 114, the transition from the first operating state 112 to the third operating state 116 avoids an increased settling time that is caused by the radio frequency module 60 entering the passive second state 114. That is, the faster settling time of the transition between the first operating state 112 and the third operating state 116 may enable quicker communications by the radio frequency front-end 58.

If the third state 116 is the same as the second state 114 (e.g., both 114 and 116 are the same state of RX, TX, sleep, idle, off, and the like), the controller 96 may cause the radio frequency module 60 to enter the second operating state 114 prior to expiration of the delay period 118. In that case, the radio frequency module 60 may be said to transition from the first state 112 to the second state 114 and/or the third state 116.

Figure 6:
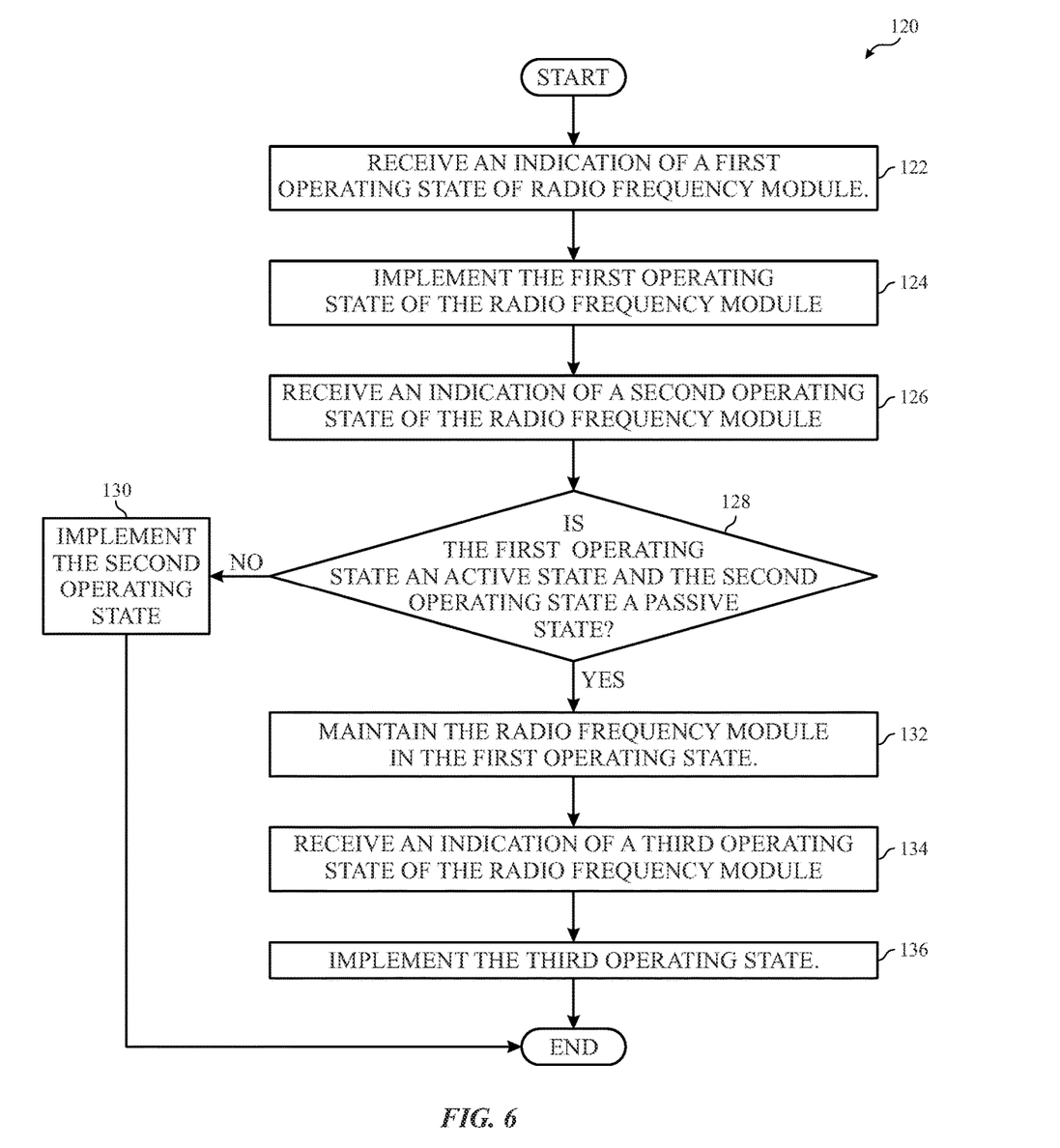
FIG. 6 is a flow diagram of a process for enabling faster switching between states of a radio frequency module by avoiding entering an intermediate passive state when in an active state, according to an embodiment of the present disclosure.

FIG. 6 is a flow diagram of a process 120 for enabling faster switching between states of a radio frequency module by avoiding entering an intermediate passive state when in an active state, according to an embodiment of the present disclosure. It should be understood that the operations of the process 120 are merely examples, may include more or fewer operations, and could be implemented in any order sufficient to ensure accurate and fast switching between states of a radio frequency module 60. In some embodiments, the process 120 may be performed by one or more processors of the electronic device 10, such as the processing circuitry 64 of the radio frequency module 60.

The process 120 begins at operation 122 where the comparison logic 82 of the processing circuitry 64 of the radio frequency module 60 receives an indication of the first operating state of the radio frequency module 60. The indication of the first operating state may include a binary state corresponding to an active or fast state (e.g., an RX state or a TX state) or a passive or slow state (e.g., an idle state or an off state). At operation 124, the controller 96 of the processing circuitry 64 implements the first operating state of the radio frequency module 60. That is, the controller 96 causes the radio frequency module 60 to enter the first operating state.

At operation 126, comparison logic 82 of the processing circuitry 64 receives an indication of the second operating state of the radio frequency module 60. At operation 128, the comparison logic 82 determines if the first operating state is an active state and the second operating state is a passive state. If not (e.g., the first operating state is a passive state or the second operating state is an active state), then the controller 96 implements the second operating state at operation 130. That is, the controller 96 causes the radio frequency module 60 to enter the second operating state (e.g., without delay).

If the comparison logic 82 determines that the first operating state is an active state and the second operating state is a passive state in operation 128, then the controller 96 maintains the first operating state of the radio frequency module 60 at operation 132. That is, the controller 96 implements a delay by preventing or blocking the radio frequency module 60 from transitioning from the first operating state.

At operation 134, the comparison logic 82 receives an indication of a third operating state of the radio frequency module 60. The controller 96 implements the third operating state at operation 136. That is, the controller 96 causes the radio frequency module 60 to enter the third operating state. In some embodiments, the third operating state may be the same as the second operating state (e.g., the target operating state of the radio frequency module 60 was the second operating state). In that case, the indication of the second operating state is received (e.g., again) at operation 134. That is, at operation 136, the radio frequency module 60 enters the second/third operating state, for which an indication is received (e.g., for a second time) at operation 134.

Maintaining the radio frequency module 60 in the first operating state at operation 132 enables the radio frequency module 60 to transition directly from an active first operating state to the third operating state without entering the passive second state (e.g., the intermediate state) and thus avoids an increased transition or settling time of the second operating state. This substantially reduces an occurrence of a slow settling time from interfering with or inhibiting the communications of the radio frequency module 60.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. Radio frequency front-end circuitry comprising:
   comparison logic configured to
      receive an indication of a first operating state of the radio frequency front-end circuitry,
      receive an indication of a second operating state of the radio frequency front-end circuitry,
      delay transitioning from the first operating state for a delay period if the first operating state is an active state and the second operating state is a passive state, and
      receive an indication of a third operating state of the radio frequency front-end circuitry; and
   processing circuitry communicatively coupled to the comparison logic and configured to cause the radio frequency front-end circuitry to
      enter the first operating state, and
      enter the third operating state after the delay period if the first operating state is the active state and the second operating state is the passive state.

2. The radio frequency front-end circuitry of claim 1, wherein the second operating state is the same as the third operating state.

3. The radio frequency front-end circuitry of claim 1, wherein the comparison logic is configured to receive an indication of a fourth operating state, and wherein the processing circuitry is configured to cause the radio frequency front-end circuitry to enter the fourth operating state if the third operating state is the passive state or the fourth operating state is the active state.

4. The radio frequency front-end circuitry of claim 1, wherein the active state comprises a transmitting state or a receiving state, and the passive state comprises a sleep state, an idle state, an off state, or a low power state.

5. The radio frequency front-end circuitry of claim 1, wherein the comparison logic is configured to block the radio frequency front-end circuitry from entering the second operating state at least until expiration of the delay period if the first operating state is the active state and the second operating state is the passive state.

6. The radio frequency front-end circuitry of claim 1, wherein the first operating state, the second operating state, and the third operating state each comprises a transmitting state, a receiving state, an idle state, a sleep state, or a low power state.

7. The radio frequency front-end circuitry of claim 1, wherein the comparison logic comprises a combination of one or more logic gates, one or more capacitors, and a plurality of delay gates.

8. The radio frequency front-end circuitry of claim 1, wherein the comparison logic is implemented as at least one flip-flop configured to determine whether to apply the delay based on a comparison of voltage levels corresponding to the first operating state and the second operating state.

9. A method comprising:
receiving, via processing circuitry, an indication of a first operating state of radio frequency front-end circuitry;
implementing, via the processing circuitry, the first operating state of the radio frequency front-end circuitry;
receiving, via the processing circuitry, an indication of a second operating state of the radio frequency front-end circuitry;
determining, via the processing circuitry, that the first operating state is an active state and the second operating state is a passive state;
maintaining, via the processing circuitry, the radio frequency front-end circuitry in the first operating state;
receiving, via the processing circuitry, an indication of a third operating state of the radio frequency front-end circuitry; and
implementing, via the processing circuitry, the third operating state.

10. The method of claim 9, comprising:
receiving, via the processing circuitry, an indication of a fourth operating state of the radio frequency front-end circuitry;
determining, via the processing circuitry, that the third operating state is the passive state or the fourth operating state is the active state; and
implementing, via the processing circuitry, the fourth operating state.

11. The method of claim 9, wherein the radio frequency front-end circuitry is maintained in the first operating state for a delay period based on the first operating state.

12. The method of claim 9, wherein the active state comprises a transmitting state or a receiving state, and the passive state comprises a sleep state, an idle state, an off state, or a low power state.

13. The method of claim 9, wherein a settling time of the passive state is longer than a settling time of the active state.

14. The method of claim 9, comprising blocking, via the processing circuitry, the radio frequency front-end circuitry from entering the second operating state at least until expiration of a delay period.

15. A user equipment comprising:
one or more antennas;
transmit circuitry configured to send a transmission signal to the one or more antennas;
receive circuitry configured to receive a reception signal from the one or more antennas; and
radio frequency front-end circuitry coupled to the one or more antennas, the transmit circuitry, and the receive circuitry, the radio frequency front-end circuitry comprising processing circuitry configured to
receive an indication of a first operating state of the radio frequency front-end circuitry,
cause the radio frequency front-end circuitry to enter the first operating state,
receive an indication of a second operating state of the radio frequency front-end circuitry,
delay transitioning from the first operating state for a delay period if the first operating state is an active state and the second operating state is a passive state,
receive an indication of a third operating state of the radio frequency front-end circuitry, and
enter the third operating state after the delay period if the first operating state is the active state and the second operating state is the passive state.

16. The user equipment of claim 15 comprising one or more integrated circuits coupled to the radio frequency front-end circuitry, the radio frequency front-end circuitry configured to provide one or more control signals to the one or more integrated circuits based on a current state of the radio frequency front-end circuitry.

17. The user equipment of claim 15, wherein the active state comprises a transmitting state or a receiving state, and the passive state comprises a sleep state, an idle state, an off state, or a low power state.

18. The user equipment of claim 15, wherein the processing circuitry is configured to cause the radio frequency front-end circuitry to enter the second operating state after the delay period if the third operating state is the same as the second operating state.

19. The user equipment of claim 15, wherein the processing circuitry comprises at least a combination of one or more logic gates, one or more capacitors, and a plurality of delay gates configured to determine to delay transitioning from the first operating state in response to determining that the first operating state is the active state and the second operating state is the passive state.

20. The user equipment of claim 15, wherein the processing circuitry comprises at least a flip-flop configured to determine whether to apply the delay transitioning from the first operating state in response to determining that the first operating state is the active state and the second operating state is the passive state based on comparing voltage levels corresponding to the first operating state and the second operating state.

* * * * *